United States Patent
Murakami et al.

(10) Patent No.: US 10,872,208 B2
(45) Date of Patent: Dec. 22, 2020

(54) SENTENCE CONVERSION SYSTEM, SENTENCE CONVERSION METHOD, AND INFORMATION STORAGE MEDIUM

(71) Applicant: Rakuten, Inc., Tokyo (JP)

(72) Inventors: Koji Murakami, Eastchester, NY (US); Lasguido Nio, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 148 days.

(21) Appl. No.: 16/228,594

(22) Filed: Dec. 20, 2018

(65) Prior Publication Data

US 2020/0201943 A1  Jun. 25, 2020

(51) Int. Cl.

| | |
|---|---|
| *G06F 40/35* | (2020.01) |
| *G06F 40/40* | (2020.01) |
| *G06F 40/58* | (2020.01) |
| *G06N 20/00* | (2019.01) |
| *G06N 3/08* | (2006.01) |

(52) U.S. Cl.
CPC ............ *G06F 40/58* (2020.01); *G06N 3/08* (2013.01); *G06N 20/00* (2019.01)

(58) Field of Classification Search
CPC .................................. G06F 40/35; G06F 40/40
See application file for complete search history.

(56) References Cited

U.S. PATENT DOCUMENTS

| | | | | |
|---|---|---|---|---|
| 2005/0131931 A1* | 6/2005 | Kawajiri | ............... | G06F 40/268 |
| 2015/0142704 A1* | 5/2015 | London | .................. | G06N 5/022 706/11 |
| 2015/0161106 A1* | 6/2015 | Barbetta | ................. | G06F 40/40 434/362 |
| 2018/0239811 A1* | 8/2018 | Cai | ......................... | G06F 40/35 |
| 2019/0197916 A1* | 6/2019 | Park | ....................... | H04L 67/22 |

FOREIGN PATENT DOCUMENTS

JP  2018028752 A  2/2018

OTHER PUBLICATIONS

R. Mitkov and L. A. Ha, "Computer-aided generation of multiplechoicetests," in Proceedings of the HLT-NAACL 03 Workshop on Building Educational Applications Using Natural Language Processing. Oct. 2003, HLT-NAACL-EDUC '03, pp. 17-22, Association for Computational Linguistics.

(Continued)

*Primary Examiner* — Shreyans A Patel
(74) *Attorney, Agent, or Firm* — HEA Law PLLC

(57) ABSTRACT

A sentence conversion system includes at least one processor that obtains data including a first type sentence and a second type sentence in association with each other, the second type sentence being a sentence obtained by converting the first type sentence into a second type in a same language, creates at least one converter that converts a sentence type in the same language based on the data and a machine translator that translates a first language into a second language, inputs the first type sentence in the at least one converter, and obtains a sentence converted by the at least one converter into the second type in the same language.

12 Claims, 7 Drawing Sheets

(56) References Cited

OTHER PUBLICATIONS

V. Rus, B. Wyse, P. Piwek, M. Lintean, S. Stoyanchev, and C. Moldovan, "The first question generation shared task evaluation challenge," in Proceedings of the 6th International Natural Language Generation Conference. Jul. 2010, INLG '10, pp. 251-257, Association for Computational Linguistics.

H. Kunichika, T. Katayama, T. Hirashima, and A. Takeuchi, "Automated question generation methods for intelligent english learning systems and its evaluation," in Proceedings of the 11th International Conference on Computers in Education, Dec. 2003, ICCE '03.

J. C. Brown, G. A. Frishkoff, and M. Eskenazi, "Automatic question generation for vocabulary assessment," in Proceedings of the Conference on Human Language Technology and Empirical Methods in Natural Language Processing. Oct. 2005, HLT '05, pp. 819-826, Association for Computational Linguistics.

Office Action dated Mar. 24, 2020, for corresponding JP Patent Application No. 2019-168458 with partial translation.

Sato Sato, Hiroyasu Itsui, Manabu Okumura, "Automatic generation of questions from product manual sentences", The 32nd Annual Conference of the Japanese Society for Artificial Intelligence DVD Jun. 5, 2018 pp. 1-4 (See partial translation of the Office Action).

* cited by examiner

FIG.3

| DECLARATIVE SENTENCE | QUESTION SENTENCE |
|---|---|
| This is a compelling and fresh white from Peregrine's organic vineyards in the Cromwell Basin. | Is this a compelling and fresh white from Peregrine's organic vineyards in the Cromwell Basin. |
| This far outperforms its $16 price: It's a powerful, elegant riesling in a Rheingau-like mode. | Does this outperform its $16 price: It's a powerful, elegant riesling in a Rheingau-like mode? |
| ... | ... |

| DECLARATIVE SENTENCE | QUESTION SENTENCE |
|---|---|
| The limey acidity pulls the wine back to make it as tight as a cocked crossbow. | What does the limey acidity do the wine back to make it as tight as a cocked crossbow? |
| This far outperforms its $16 price. It's a powerful, elegant riesling in a Rheingau-like mode. | How far does this outperform its $16 price. It's a powerful, elegant riesling in a Rheingau-like mode? |
| . . . | . . . |

$D_{WH}$

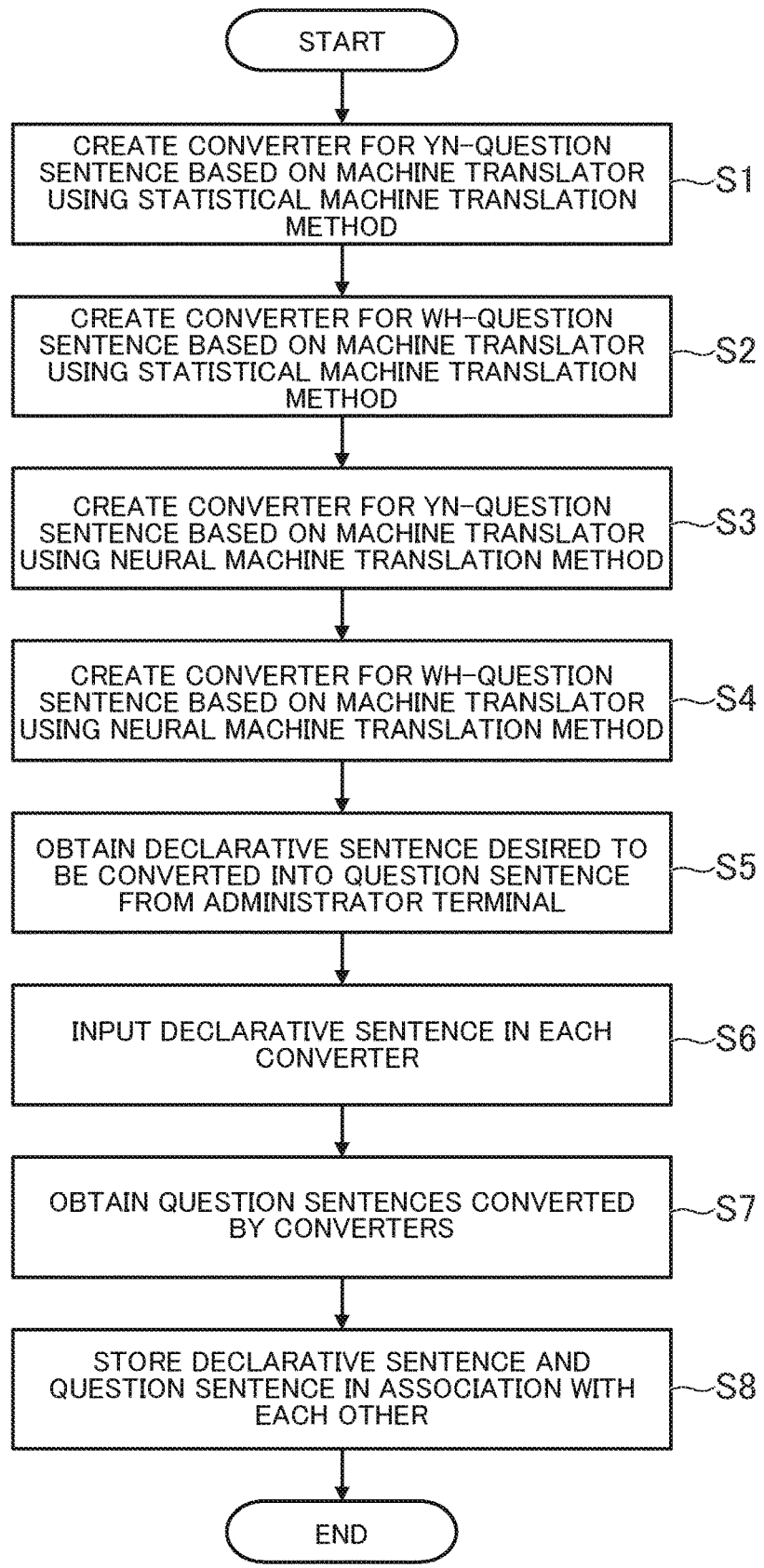

SENTENCE CONVERSION SYSTEM, SENTENCE CONVERSION METHOD, AND INFORMATION STORAGE MEDIUM

TECHNICAL FIELD

The present invention relates to a sentence conversion system, a sentence conversion method, and an information storage medium.

BACKGROUND ART

In the field of natural language, a technology of converting a certain kind of sentence into another kind of sentence has been studied. For example, Non-Patent Literatures 1 to 4 describe that a human manually defines a rule for converting a declarative sentence into a question sentence, and a declarative sentence applying to the rule is converted into a question sentence based on the rule.

CITATION LIST

Non-Patent Document

Non-Patent Literature 1: R. Mitkov and L. A. Ha, "Computer-aided generation of multiplechoice tests," in Proceedings of the HLT-NAACL 03 Workshop on Building Educational Applications Using Natural Language Processing. 2003, HLT-NAACL-EDUC '03, pp. 17-22, Association for Computational Linguistics.

Non-Patent Literature 2: V. Rus, B. Wyse, P. Piwek, M. Lintean, S. Stoyanchev, and C. Moldovan, "The first question generation shared task evaluation challenge," in Proceedings of the 6th International Natural Language Generation Conference. 2010, INLG '10, pp. 251-257, Association for Computational Linguistics.

Non-Patent Literature 3: H. Kunichika, T. Katayama, T. Hirashima, and A. Takeuchi, "Automated question generation methods for intelligent english learning systems and its evaluation," in Proceedings of the 11th International Conference on Computers in Education, 2003, ICCE '03.

Non-Patent Literature 4: J. C. Brown, G. A. Frishkoff, and M. Eskenazi, "Automatic question generation for vocabulary assessment," in Proceedings of the Conference on Human Language Technology and Empirical Methods in Natural Language Processing. 2005, HLT '05, pp. 819-826, Association for Computational Linguistics.

SUMMARY OF INVENTION

Technical Problem

However, in Non-Patent Literatures 1 to 4, a declarative sentence applying to the rule can be converted into an accurate question sentence, although declarative sentences do not always apply to the rule. As such, if a declarative sentence that does not apply to the rule is entered, the entered sentence is not converted into a question sentence, and a desired sentence cannot be obtained. In this regard, if a large number of rules are prepared, accuracy of the conversion may be somehow increased. However, such a manner requires a lot of time and effort because a human needs to define rules manually.

One or more embodiments of the present invention have been conceived in view of the above, and an object thereof is to provide a sentence conversion system, a sentence conversion method, and an information storage medium capable of increasing accuracy in conversion of a sentence without taking time and effort.

Solution to Problem

In order to solve the above described problems, a sentence conversion system according to the present invention includes at least one processor that obtains data which includes a first type sentence and a second type sentence in association with each other, the second type sentence being a sentence obtained by converting the first type sentence into a second type in a same language, creates at least one converter that converts a sentence type in the same language based on the data and a machine translator that translates a first language into a second language, inputs the first type sentence in the at least one converter, and obtains the second type sentence converted by the at least one converter in the same language.

A sentence conversion method according to the present invention is performed by at least one computer and includes obtaining data which includes a first type sentence and a second type sentence in association with each other, the second type sentence being a sentence obtained by converting the first type sentence into a second type in a same language, creating at least one converter that converts a sentence type in the same language based on the data and a machine translator that translates a first language into a second language, inputting the first type sentence in the at least one converter, and obtaining the second type sentence converted by the at least one converter in the same language.

A non-volatile information storage medium according to the present invention stores a program for at least one converter that is created based on data and a machine translator that translates a first language into a second language, the data which includes a first type sentence and a second type sentence in association with each other, the second type sentence being a sentence obtained by converting the first type sentence into a second type in a same language. The program causes a computer to, in a case where the first type sentence is entered, obtain the second type sentence converted in the same language.

In one aspect of the present invention, the at least one processor creates the at least one converter based on the machine translator using a statistical machine translation method.

In one aspect of the present invention, the at least one processor creates the at least one converter based on the machine translator using a neural machine translation method.

In one aspect of the present invention, the second type has a plurality of classifications, and the data and the at least one converter are prepared for each of the plurality of classifications. The at least one processor obtains data of each of the plurality of classifications, creates a converter for each of the plurality of classifications based on data of each of the plurality of classifications, inputs the first type sentence in a converter of at least one classification, and obtains a sentence converted into the classification in the same language by the converter of the at least one classification.

In one aspect of the present invention, the at least one classification has a plurality of sub classifications and the data and the at least one converter are prepared for each of the plurality of sub classifications. The at least one processor obtains data of each of the plurality of sub classifications, creates a converter for each of the plurality of sub classifi- cations based on data of each of the plurality of sub classifications, inputs the first type sentence in a converter for at least one sub classification, and obtains a sentence converted into the sub classification in the same language by the converter of the at least one sub classification.

In one aspect of the present invention, the first type has a plurality of classifications, and the data and the at least one converter are prepared for each of the plurality of classifications. The at least one processor obtains data of each of the plurality of classifications, creates a converter for each of the plurality of classifications based on data of each of the plurality of classifications, and inputs, in a converter for at least one classification, a sentence of the at least one classification.

In one aspect of the present invention, the at least one classification has a plurality of sub classifications, and the data and the at least one converter are prepared for each of the plurality of sub classifications. The at least one processor obtains data of each of the plurality of sub classifications, creates a converter for each of the plurality of sub classifications based on data of each of the plurality of sub classifications, and inputs, in a converter for at least one sub classification, a sentence of the at least one sub classification.

In one aspect of the present invention, the first type sentence is a declarative sentence. The second type sentence is a question sentence. The data is associated with a declarative sentence and a question sentence. The at least one converter converts a declarative sentence into a question sentence in the same language.

In one aspect of the present invention, the at least one processor inputs a declarative sentence indicating a feature of an item in the at least one converter, obtains a question sentence converted by the at least one converter, the question sentence asking the feature of the item, and generates Q & A (Question and Answer) or FAQ (Frequently Asked Questions) of the item based on the input declarative sentence and the obtained question sentence.

Effects of the Invention

According to the present invention, accuracy in conversion of a sentence can be increased without taking time and effort.

BRIEF DESCRIPTION OF THE DRAWINGS

FIG. 3 is a diagram illustrating an example of association data in YN-format;

FIG. 4 is a diagram illustrating an example of association data in WH-format;

FIG. 7 is a flow chart showing an example of processing executed in a server.

DESCRIPTION OF EMBODIMENTS

[1. Hardware Configuration of Sentence Conversion System]

Figure 1:
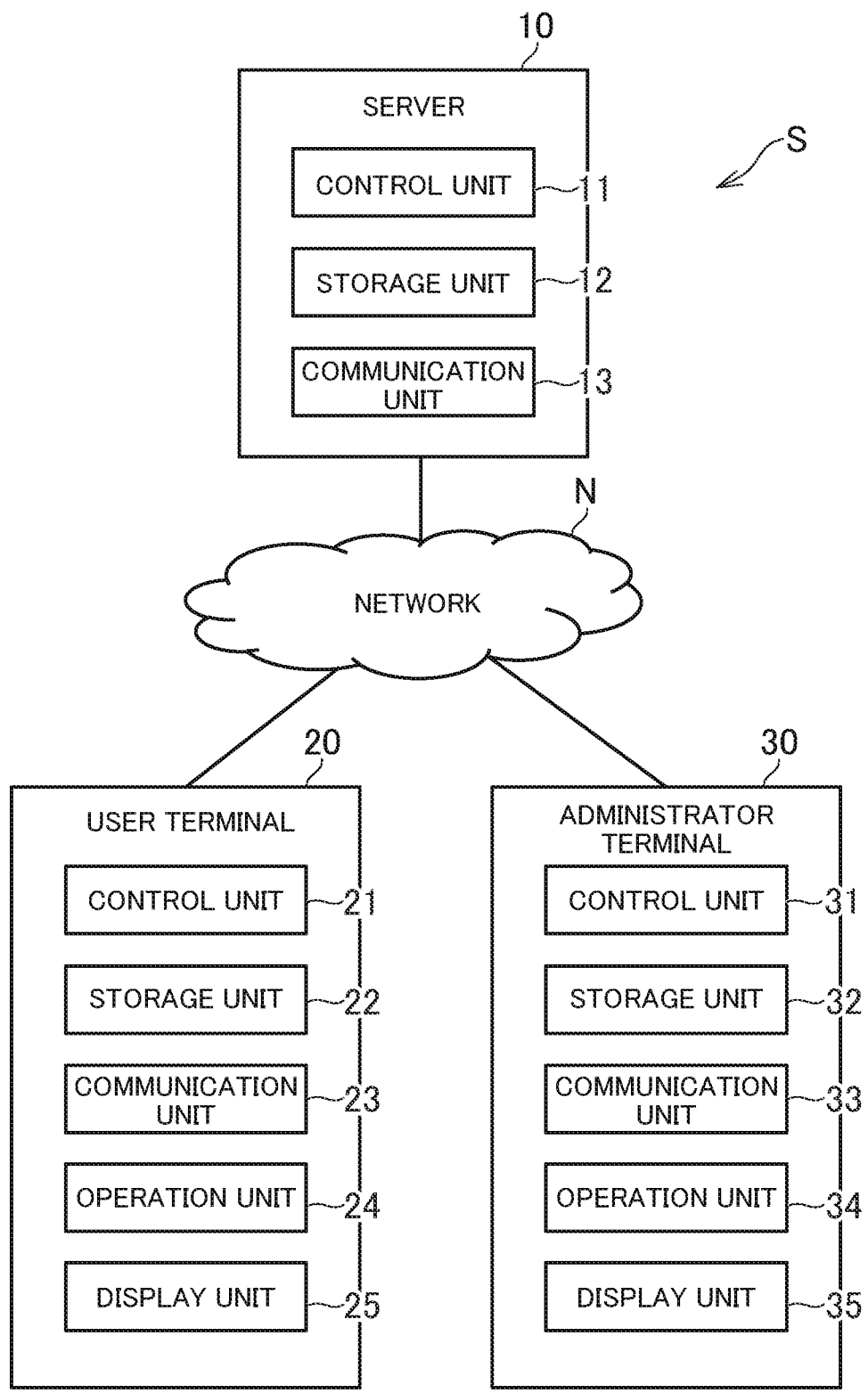
FIG. 1 is a diagram illustrating an overall configuration of a sentence conversion system.

An embodiment of the sentence conversion system according to the present invention will be described below. FIG. 1 is a diagram illustrating an overall configuration of the sentence conversion system. As shown in FIG. 1, the sentence conversion system S includes a server 10, a user terminal 20, and an administrator terminal 30, each connected to a network N. FIG. 1 shows one server 10, one user terminal 20, and one administrator terminal 30, although the number of each of them may be two or more.

The server 10 is a server computer and includes a control unit 11, a storage unit 12, and a communication unit 13, for example. The control unit 11 includes at least one processor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 includes a wired or wireless communication interface for data communications through the network N, for example.

The user terminal 20 is a computer operated by a user, such as a personal computer, a portable information terminal (including a tablet computer), and a mobile phone (including a smartphone). The user terminal 20 includes a control unit 21, a storage unit 22, a communication unit 23, an operation unit 24, and a display unit 25. The hardware configuration of the control unit 21, the storage unit 22, and the communication unit 23 may be the same as the hardware configuration of the control unit 11, the storage unit 12, and the communication unit 13. The operation unit 24 is an input device for a user to operate, including a pointing device, such as a touch panel and a mouse, and a keyboard. The operation unit 24 transmits an operation of the user to the control unit 21. The display unit 25 is, for example, a liquid crystal display unit or an organic EL display unit.

The administrator terminal 30 is a computer for an administrator to operate, such as a personal computer, a portable information terminal, and a mobile phone. The administrator terminal 30 includes a control unit 31, a storage unit 32, a communication unit 33, an operation unit 34, and a display unit 35. The hardware configuration of the control unit 31, the storage unit 32, the communication unit 33, the operation unit 34, and the display unit 35 may be the same as the hardware configuration of the control unit 11, the storage unit 12, the communication unit 13, the operation unit 24, and the display unit 25.

The programs and data described as being stored in the storage units 12, 22, and 32 may be provided to these units through a network. The hardware configuration of the server 10, the user terminal 20, and the administrator terminal 30 is not limited to the above examples, and can adopt various types. For example, the server 10, the user terminal 20, and the administrator terminal 30 may each include a reader (e.g., optical disc drive and memory card slot) for reading a computer-readable information storage medium, and an input/output unit (e.g., USB port) for directly connecting to external devices. In this case, the programs and data stored in the information storage medium may be provided to each of the server 10, the user terminal 20, and the administrator terminal 30 through the readers or the input/output units.

[2. Overview of Sentence Conversion System S]

The sentence conversion system S generates a converter that converts a sentence type within the same language for various purposes, such as creation of Q & A (Question and Answer) or FAQ (Frequently Asked Questions), creation of examination questions, and use of Chabot, and converts a first type sentence into a second type sentence in the same language based on the generated converter.

The same language means that the type of the language is the same. In other words, the same language means that a language of a sentence before conversion and a language of a sentence after conversion are the same. The sentence conversion system S can convert sentences of any language on the earth, such as English, Japanese, Chinese, Korean, Hindi, Spanish, and Arabic. Further, the languages may include not only currently used language but also classical language that is no longer used.

The types of sentences are written forms of sentences, such as a declarative sentence, a question sentence, an exclamatory sentence, and an imperative sentence. In this embodiment, a declarative sentence and a question sentence will be mainly described, although other types of sentences, such as an exclamatory sentence and an imperative sentence, may also be applicable as described in variations.

Declarative sentences are used to state facts. Declarative sentences can be formed in both positive and negative forms. For example, a declarative sentence in English includes a subject at the beginning of the sentence, and a predicate (verb) immediately or two or three words after the subject. For example, a declarative sentence in Japanese includes a subject at the beginning of the sentence, and a predicate at the end of the sentence. In a case of Japanese, a subject may be omitted, and this applies to the other types of sentences.

Question sentences are used to ask questions, and written in a query format. Question sentences have a plurality of classifications. The classifications are detailed types included in a sentence type, and question sentences are classified into a YN question sentence, a WH question sentence, a choice question sentence, a tag question sentence, and an indirect question sentence. In this embodiment, a YN-question sentence and a WH-question sentence are mainly described, although other types of question sentences may be applicable.

For example, in a YN-question sentence in English, a subject and a predicate in a declarative sentence are exchanged, or an auxiliary verb such as Do is placed at the beginning. For example, a WH-question sentence in English begins with a wh-word, such as What, Which, Why, and Where, or How. For example, a YN-question sentence in Japanese ends with a sentence-final particle, which indicates a question sentence. For example, a WH-question sentence in Japanese begins with a Japanese word corresponding to a wh-word or How in English. For example, a YN-question sentence and a WH-question sentence each end with a question mark, such as "?".

The first type is one of the types of sentences described above. In other words, the first type can be described as a type of a sentence before conversion, or a type of a sentence to be entered into the converter. The second type is one of the types of sentences described above other than the first type sentence. In other words, the second type is a type of a sentence after conversion, or a type of a sentence to be output from the converter. For example, the first type is one of a declarative sentence, a question sentence, an exclamatory sentence, and an imperative sentence, and the second type is one of a declarative sentence, a question sentence, an exclamatory sentence, and an imperative sentence and other than the first type sentence.

The converter is a program (application) for converting a type of a sentence. In other words, the converter is an algorithm that defines a method of converting a type of a sentence. The converter may employ a model used in what we call machine learning, or a model that is not particularly relevant to machine learning. The machine learning may adopt any method, such as recurrent neural network or convolutional neural network.

In this embodiment, English will be taken as an example of language. Further, a declarative sentence will be described as an example of the first type sentence, and a question sentence will be described as an example of the second type sentence. As such, in this embodiment, a case will be described in which the sentence conversion system S performs processing for converting a declarative sentence in English into a question sentence in English.

As described in the Background Art, in the method where a human manually defines rules of converting a declarative sentence into a question sentence (hereinafter, referred to as "rule-based method"), the human needs to define many rules manually and thus a lot of time and effort are required. As such, with the use of a system of a machine translator, the sentence conversion system S creates a converter that converts a declarative sentence into a question sentence in the same language, thereby improving accuracy in conversion of the declarative sentence into the question sentence using the converter.

The machine translator is a program (application) for translating a sentence in a certain language into another language. In other words, the machine translator is an algorithm that defines a method of translating sentences. The machine translator can adopt any method. In this embodiment, a corpus-based method using a corpus, in which a large number of sentences are converted into data, is used instead of the rule-based method in which a human manually regulates translation knowledge.

In the rule-based method, translation knowledge such as context is created by human hands, while in the corpus-based method, the translation knowledge is automatically acquired from a large number of translated sentences. The corpus-based method includes a statistical machine translation method, a neural machine translation method, and an example-based machine translation method, for example, and may adopt any of these methods. In this embodiment, the statistical machine translation method and the neural machine translation method are used. These methods will be described later in detail.

The machine translator has a system that absorbs differences of appearances and grammar between different languages. The sentence conversion system S uses such a system to convert sentences in the same language, thereby absorbing differences of appearances and grammar between declarative sentences and question sentences. This eliminates the need of defining many rules by human hands as in the rule-based method, thereby improving accuracy of converting a declarative sentence into a question sentence without taking time and effort. In the following, features of the sentence conversion system S will be described in details below.

[3. Processing Executed in this Embodiment]

Figure 2:
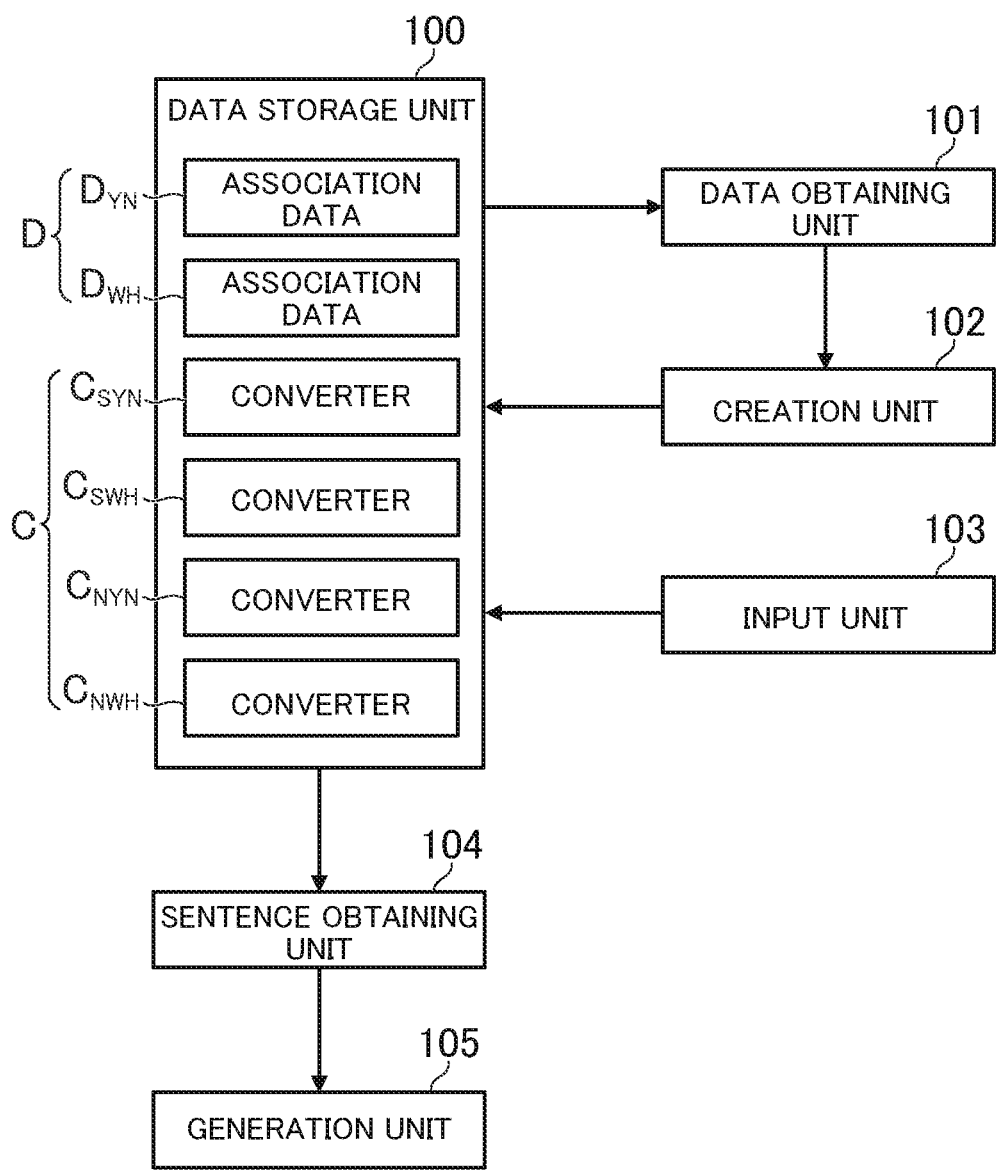
FIG. 2 is a functional block diagram showing an example of functions implemented in the sentence conversion system S.

FIG. 2 is a functional block diagram showing an example of functions implemented in the sentence conversion system S. As shown in FIG. 2, in this embodiment, the server 10 implements a data storage unit 100, a data obtaining unit 101, a creation unit 102, an input unit 103, a sentence obtaining unit 104, and a generation unit 105. The data storage unit 100 is implemented mainly by the storage unit 12, and each of the data obtaining unit 101, the creation unit 102, the input unit 103, the sentence obtaining unit 104, and the generation unit 105 is implemented mainly by the control unit 11.

[3-1. Data Storage Unit]

The data storage unit 100 stores data necessary for converting types of sentences in the same language. For example, the data storage unit 100 stores association data D, in which declarative sentences and question sentences are associated, and a converter C. The declarative sentences and the question sentences to be stored in the association data D are entered by a person. The person who enters the declarative sentences and the person who enters the question sentences may be the same person or different persons. In this embodiment, a case will be described in which declarative sentences to be stored in the association data D are entered by a user, and question sentences to be stored in the association data D are entered by an administrator.

The declarative sentences and the question sentences may have any content, and may be determined based on a use of the sentence conversion system S. In this embodiment, a case will be described in which the declarative sentences and the question sentence relate to items of products and services. The products may be any tangible entities such as food and daily goods, or intangible entities such as music, video, and applications. The services may be any services, such as an accommodation service, a food and beverage serving service in restaurants, insurance service, and a financial service.

For example, the declarative sentences stored in the association data D are reviews of items. The reviews are thoughts on the items, and entered by, for example, a user who operates the user terminal 20. For example, the user inputs a review after the user purchases or reserves an item. When the user operates the user terminal 20 to input a review, such a review is stored in the association data D as a declarative sentence. The declarative sentence may be an explanation of the item instead of a review.

For example, the question sentence associated with the association data D is a sentence for inquiring about an item. For example, the question sentence is entered by an administrator who operates the administrator terminal 30. For example, the administrator refers to a review, which is a declarative sentence, and enters a question sentence for obtaining the review as an answer. That is, the administrator enters a question sentence so that a user enters a review as an answer to the question sentence entered by the administrator.

The association data D may be formed as one data set, although in this embodiment, the association data D is formed such that a data set is prepared for each classification of question sentences, because question sentences include a plurality of classifications, such as a YN-question sentence and a WH-question sentence, as described above. In the following, association data D for YN-question sentences is marked with $D_{YN}$, and association data D for WH-question sentences is marked with $D_{WH}$. When it is not necessary to distinguish each data set, association data is simply marked with D.

FIG. 3 is a diagram illustrating an example of association data $D_{YN}$ in YN-format. As shown in FIG. 3, in the association data $D_{YN}$, a declarative sentence is associated with a question sentence obtained by converting the declarative sentence into a YN-format sentence in the same language. This question sentence is for obtaining the declarative sentence as an answer in the YN-format. In this embodiment, a review for an item is stored as a declarative sentence, and thus the administrator replaces a subject with a predicate of the review entered by a user or enters a word, such as Do and Does, at the beginning of the review so as to generate a YN-format question sentence.

FIG. 4 is a diagram illustrating an example of association data $D_{WH}$ in WH-format. As shown in FIG. 4, in the association data $D_{WH}$, a declarative sentence is associated with a question sentence obtained by converting the declarative sentence into a WH-format sentence in the same language. This question sentence is for obtaining the declarative sentence as an answer in the WH-format. In this embodiment, a review for an item is stored as a declarative sentence, and thus the administrator replaces a subject with a predicate of the review entered by a user and enters a word, such as a wh-word and How, at the beginning of the review so as to generate a WH-format question sentence.

Here, a case will be described in which the association data $D_{YN}$ in YN-format and the association data $D_{WH}$ in WH-format are separately prepared, although these data sets may be integrated. In this case, information for identifying whether a question sentence stored in each record is YN-format or WH-format may be stored.

The data storage unit 100 stores a converter C created based on the association data D described above. As described later in detail, the converter C is created by building models and adjusting parameters by the creation unit 102, and thus the data storage unit 100 stores the converter C after the models are built or the parameters are adjusted.

As described later in detail, in this embodiment, a converter C is prepared for each classification of question sentences. Further, a converter C using the statistical machine translation method and a converter C using the neural machine translation method are prepared. In the following, a converter C for YN-question sentences using the statistical machine translation method is marked with $C_{SYN}$, and a converter C for WH-question sentences using the statistical machine translation method is marked with $C_{SWH}$. Further, a converter C for YN-question sentences using the neural machine translation method is marked with $C_{NYN}$, and a converter C for WH-question sentences using the neural machine translation method is marked with $C_{NWH}$. When it is not necessary to distinguish the converters, they are simply marked with C.

The data stored in the data storage unit 100 is not limited to the above example. The data storage unit 100 may store data necessary for converting types of sentences in the same language. For example, the data storage unit 100 may store a machine translator before the models are built or the parameters are adjusted.

[3-2. Data Obtaining Unit]

The data obtaining unit 101 obtains association data D in which a first type sentence is associated with a sentence obtained by converting the first type sentence into second type in the same language. In this embodiment, a declarative sentence corresponds to the first type sentence, and a question sentence corresponds to the second type sentence, and thus, as shown in FIGS. 3 and 4, declarative sentences and question sentences are associated to each other in the association data D.

In this embodiment, the data storage unit 100 stores association data D, and thus, the data obtaining unit 101 obtains the association data D stored in the data storage unit 100. The association data D may be stored in an external computer other than the server 20 or an external information storage medium. In this case, the data obtaining unit 101 obtains association data D stored in the external computer or the external information storage medium.

In this embodiment, question sentences include a plurality of classifications, and association data D is prepared for each classification. As such, the data obtaining unit 101 obtains association data D for each classification. The data obtaining unit 101 obtains association data D when a converter C is created, and thus association data D corresponding to a converter C to be created is obtained. For example, if the creation unit 102 creates a converter C for YN-question sentences, the data obtaining unit 101 obtains the association data $D_{YN}$ for YN-question sentences, and if the creation unit 102 creates a converter C for WH-question sentences, the data obtaining unit 101 obtains the association data $D_{WH}$ for WH-question sentences.

[3-3. Creation Unit]

The creation unit 102 creates a converter C for converting types of sentences in the same language based on the association data D and the machine translator for translating a first language into a second language. The first language is a language before translation and to be entered into the machine translator. The second language is a language after translation and to be output from the machine translator.

This embodiment aims to enhance a value of equation 1 below so as to output a natural question sentence. The value of the equation 1 can be described as an index indicating accuracy of the converter C. The equation 1 below is an example. Accuracy of the converter C may be evaluated in any of other indexes, and improving other indexes may be aimed at.

$$\hat{q} = \underset{q}{\operatorname{argmax}}\ P(q\mid c) \qquad \text{Equation 1}$$

In the equation 1, c is a sentence to be input to the converter C, and a declarative sentence to be input to the converter C in this embodiment. In the equation 1, q is a sentence to be output from the converter C, and a question sentence to be output from the converter C in this embodiment. Input (declarative sentence) and output (question sentence) may be a character string in any length. A declarative sentence and a question sentence are formed of arrangements of character strings, and thus the declarative sentence c may be described as an arrangement of character strings $[c_1, \ldots, c_{|C|}]$, and the question sentence q to be output may be described as an arrangement of character strings $[q_1, \ldots, q_{|q|}]$.

P (q|c) in the right side of the equation 1 is conditional probability of the question sentence q to be output when the declarative sentence c is entered. As the value is higher, the accuracy of the question sentence is more increased. As such, in the equation 1, the aim of this embodiment is to create a converter C capable of outputting q that maximizes P (q|c).

The creation unit 102 creates a converter C that uses the same system as the machine translator. To create a converter C is to build models or adjust parameters for converting a declarative sentence into a question sentence by using the program code of the machine translator (without changing the program code of the machine translator), instead of writing a program code of the converter C from the beginning. In other words, to create a converter C corresponds to build models or adjust parameters of a converter C by using the methods of building models or adjusting parameters of the machine translator.

The converter C and the machine translator have the same methods of building models or adjusting parameters. In this regard, however, data sets being referred to when building models or adjusting parameters are different between the converter C and the machine translator. As described below, in the machine translator, building models or adjusting parameters is performed based on parallel translation data in which the first language sentences are associated with the second language sentences. In the converter C, building models or adjusting parameters is performed based on association data D.

As described above, the machine translator can be any machine translator, although in this embodiment, a converter C using the statistical machine translation method and a converter C using the neural machine translation method will be described.

[Converter Using Statistical Machine Translation Method]

A converter C using the statistical machine translation method will be described. The statistical machine translation method statistically analyzes parallel translation data in which a first language sentence is associated with a sentence obtained by translating the first language sentence into a second language so as to create a machine translation model. In the statistical machine translation method, an input sentence is divided into a plurality of elements, and each element is translated. An element is a unit of translation, and includes at least one word.

The statistical machine translation method includes a model in which each word is an element, although information of context is sometimes hard to be used in this model. As such, this embodiment will describe a model to use a phrase as an element so as to effectively use context information. A phrase is at least one block of words. All phrases do not necessarily include a plurality of words respectively, and a phrase may include only one word. Any number of words may be included in a phrase, although it may be difficult to take statistics on a phrase when it is too long, because a too-long phrase does not appear multiple times. As such, in this embodiment, a phrase includes about one to five words.

Figure 5:
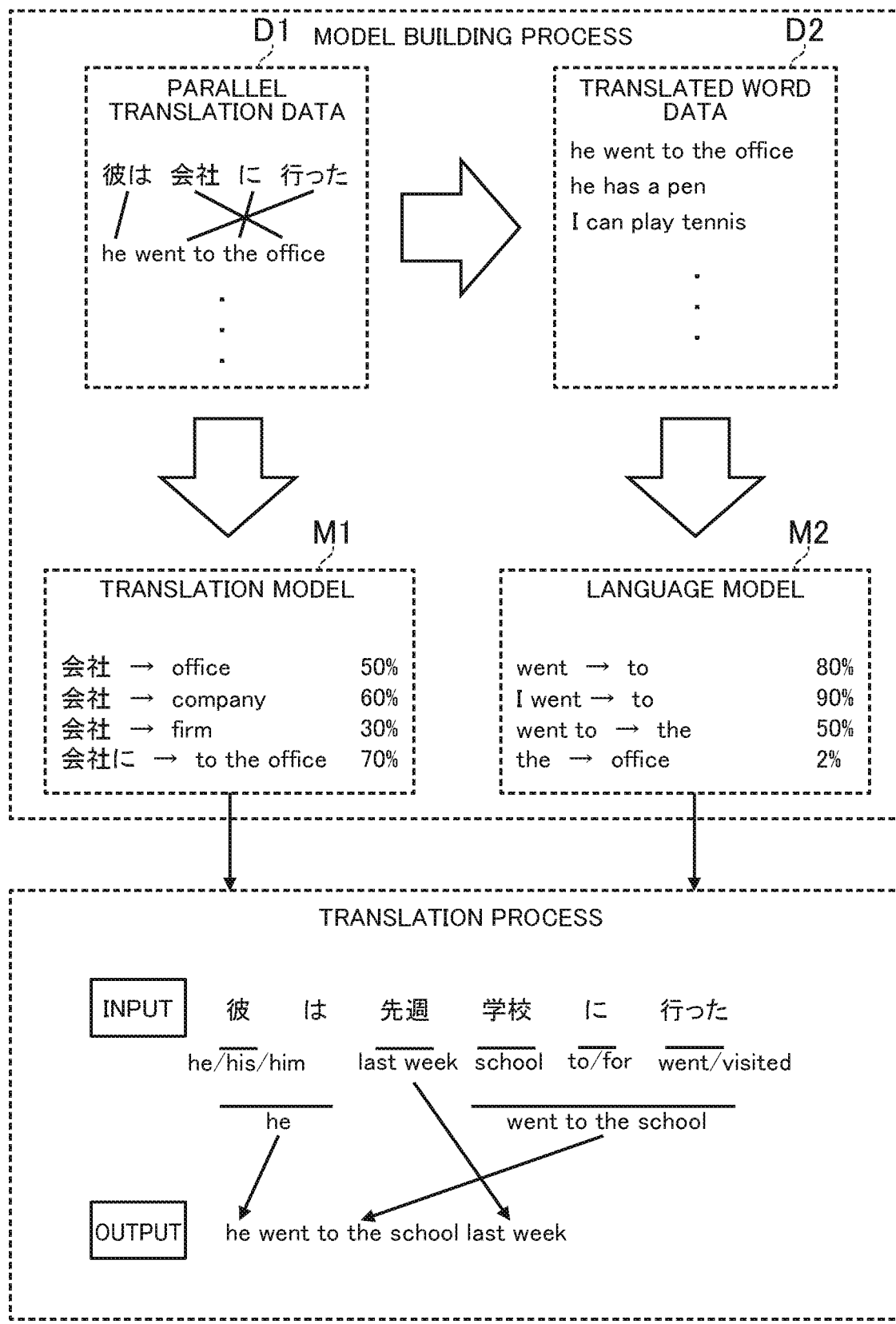
FIG. 5 is a diagram for explaining a system of a statistical machine translation method.

FIG. 5 is a diagram for explaining a system of the statistical machine translation method. As shown in FIG. 5, the machine translator using the statistical machine translation method performs a model building process for building models using parallel translation data D1 and a translation process for translating sentences using the built model. These processes are executed based on the program of the machine translator. That is, the processes described below are defined in the program code of the machine translator. The same applies to the converter C created by the creation unit 102, and processes of the converter C is defined in the program code.

The parallel translation data D1 defines combination of inputs and outputs in the machine translator. In other words, the parallel translation data D1 defines a correct output to an input. An input is a sentence of the first language before translation, and an output is a sentence of the second language after translation. The parallel translation data D1 may be referred to as teacher data or training data, and basically created by human manually.

The first language and the second language may have any combination, and in this embodiment, a case will be described in which the first language is Japanese and the second language is English. That is, a machine translator for translating a Japanese sentence into an English sentence will be described. As shown in FIG. 5, in the parallel translation data D1, a Japanese sentence is associated with a sentence obtained by translating the Japanese sentence into English. For simplicity, only one of such combinations is shown in FIG. 5, although a large number of combinations are actually stored in the parallel translation data D1.

In the model building process, each of Japanese sentences and English sentences stored in the parallel translation data D1 is divided into phrases, and correspondence between Japanese phrases and English phrases is estimated. The method for dividing a sentence into phrases may use various methods. For example, a sentence may be divided into phrases by a predetermined number of words or clauses, or syntactic analysis may be performed on a sentence to be divided into phrases. The method for estimating the correspondence may also adopt various methods. For example, the correspondence may be estimated and entered by human manually, or automatically estimated using statistical information, such as appearance frequency of words.

Figure 6:
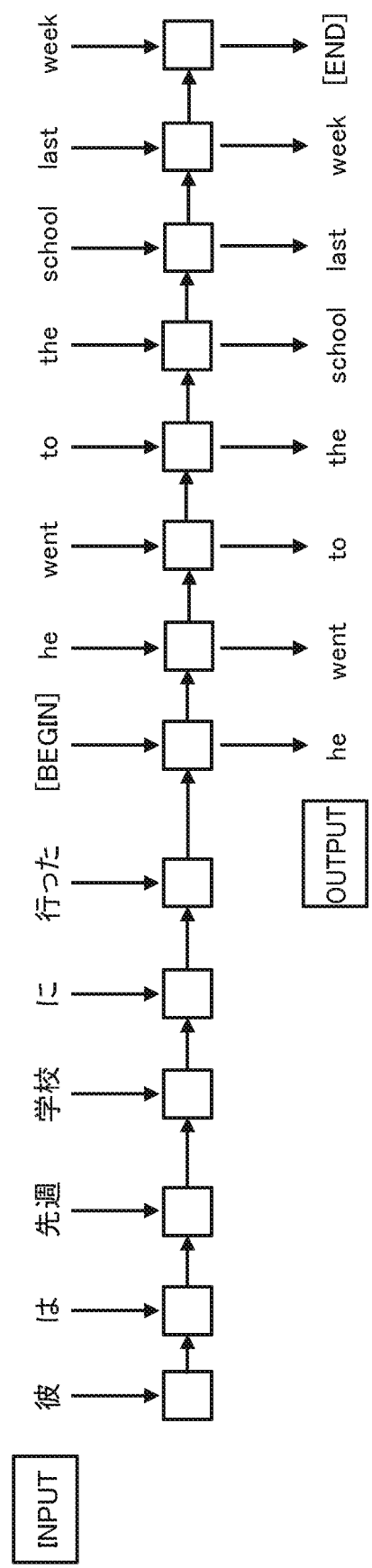
FIG. 6 is a diagram for explaining a system of a neural machine translation method.

Subsequently, based on the estimated correspondence, a translation model M1 indicating relationship between Japanese phrases and English phrases is generated. In the example of FIG. 6, the translation model M1 stores Japanese phrases and corresponding English phrases, and its probability. Here, the probability that phrases correspond to each other is indicated, and calculated from, for example, appearance frequency in the parallel translation data D1. Here, the appearance frequency is the number of times a combination of a Japanese phrase and a corresponding English phrase appears in the parallel translation data D1. When the appearance frequency is higher, the number of combinations of the phrases is larger, and thus the probability that the phrases correspond to each other is high.

Lastly, translated word data D2, which indicates only English sentences in the parallel translation data D1, is obtained. A language model M2 indicating phrases that tend to be consecutive is then generated based on the translated word data D2. In the example of FIG. 6, the language model M2 stores probability that phrases are consecutive. Here, the probability that a phrase is followed by another phrase is indicated, and calculated from, for example, appearance frequency in the translated word data D2. Here, the appearance frequency is the number of times a phrase is followed by a corresponding phrase. When the appearance frequency is higher, the probability that the phrase is followed by the corresponding phrase is higher. The model building process then terminates.

Next, the translation process will be described. In the translation process, a Japanese sentence is translated into an English sentence based on the translation model M1 and the language model M2 built in the model building process. For example, when a Japanese sentence is entered into the machine translator, the sentence is divided into phrases, and English phrases corresponding to the Japanese phrases are searched based on the translation model M1. All of the English phrases corresponding to the Japanese phrases may be searched from phrases stored in the translation model M1, or only the English phrases having probability of a threshold value or more may be searched.

Subsequently, a score of each sentence, in which the English phrases thus searched are combined, is calculated based on the probability stored in the translation model M1 and the probability stored in the language model M2. The score is a value indicating accuracy of translation, and is calculated by substitution of these probabilities into a predetermined equation. A sentence including more number of combinations of phrases having higher probability has a high score.

A sentence having a high score indicates that the sentence includes a combination of phrases having the statistically greater number of appearances and is close to a sentence manually translated by human, and thus accuracy is high. That is, when a score of a sentence is higher, appearance frequency of phrases used in the sentence is higher, and thus a likely sentence is generated. There may be a large number of combinations of English phrases. As such, among these combinations, the combination of phrases having the highest score and properly matching the Japanese sentence is searched and a sentence obtained by connecting these phrases is output, and the translation process terminates.

As described above, the machine translator using the statistical machine translation method builds the translation model M1 and the language model M2 based on the parallel translation data D1 and the translated word data D2. The Japanese sentence entered in the machine translator is then divided into a plurality of phrases, each of which is translated into an English phrase as an element, and the combination of phrases having the highest score and properly matching the Japanese sentence is output as the English sentence.

For example, the creation unit 102 creates a converter C based on the machine translator using the statistical machine translation method described above. In the converter C using the statistical machine translation method, an input sentence is divided into a plurality of elements, each of which is converted, and the combination of phrases having the highest score and properly matching the Japanese sentence is output as the converted sentence. Here, the element is a unit of conversion, and includes at least one word. As described above, this embodiment will describe the model in which an element is not a word but a phrase.

The creation unit 102 builds a model using the association data D instead of the parallel translation data D1 and the translated word data D2. The creation unit 102 creates a conversion model instead of the translation model M1. The conversion model indicates relationship between phrases included in declarative sentences stored in the association data D and phrases included in question sentences stored in the association data D.

For example, the creation unit 102 divides each of the declarative sentences and the question sentences stored in the association data D into phrases, and estimates correspondence between the phrases of the declarative sentences and the phrases of the question sentences. The methods for dividing sentences into phrases and estimating the correspondence are as described above. For example, the correspondence is estimated and entered by human manually, or automatically estimated using statistical information, such as appearance frequency of words.

The creation unit 102 creates the conversion model indicating relationship between the phrases included in the declarative sentences and the phrases included in the question sentences based on the estimated correspondence. The method for generating the conversion model is the same as the method for generating the translation model M1. The estimated phrases are associated with each other, and probabilities are calculated based on appearance frequency in the association data D.

Instead of the language model M2, the creation unit 102 then creates a language model indicating phrases that tend to be consecutive based on the association data D. For example, the creation unit 102 extracts question sentences from the association data D, and creates a language model indicating phrases that tend to be consecutive. The method for creating the language model is the same as the method for creating the language model M2. The probability that a plurality of phrases are consecutive is calculated and stored in the language model. According to the processes described above, the creation unit 102 creates the conversion model and the language model of the converter C and stores them in the data storage unit 100, and terminates the creation of the converter C. The conversion model and the language model may be integrated with the data of the converter C and stored in the data storage unit 100, or stored in the data storage unit 100 separately from the data of the converter C so as to be referred to by the converter C.

The translation process illustrated in FIG. 5 corresponds to processes of the input unit 103 and the sentence obtaining unit 104 to be described later, and thus will be described later. The statistical machine translation method for creating the converter C is not limited to the above example. Other methods may be applied to the statistical machine translation method. For example, the methods described in theses, such as "Statistical Phrase-Based Translation (http://www.aclweb.org/anthology/N03-1017)" and "Phrase-Based Statistical Machine Translation (https://pdfs.semanticscholar.org/223d/cd0e44532fc0 2444709e61327432c74fe46d.pdf)", may be applied.

The above described method using the statistical machine translation method can be described by using equations as follows. For example, in the statistical machine translation method, a combination of a declarative sentence and a question sentence may be treated as a parallel translation in a machine translator based on what we call "noisy channel model", or equation 1 may be redefined as equation 2 using Bayes' rule. The statistical machine translation method aims to enhance a value of the equation 2 below.

$$\hat{q} = \underset{q}{\operatorname{argmax}}\ P(c \mid q) P_{LM}(q). \qquad \text{Equation 2}$$

P (c|q) in the right side of the equation 2 is conditional probability distribution in the conversion model (translation model in the machine translator), and $P_{LM}$ (q) is probability distribution of the language model. The equation 2 aims to increase a score of a question sentence output from a converter, and, for example, aims to output a question sentence having the highest score based on probability stored in the conversion model and probability stored in the language model. More specifically, the conversion model is defined as equation 3 below.

$$P(c_i^I \mid q_i^I) = \Pi_{i=1}^I \varphi(\overline{c_i} \mid \overline{q_i}) d(\text{start}_i - \text{end}_{i-1}). \qquad \text{Equation 3}$$

In the equation 3, $c_i^I$ (overline is omitted) indicates each phrase divided from a declarative sentence c stored in the association data D, and $q_i^I$ (overline is omitted) indicates each phrase divided from a question sentence q stored in the association data D. Using the above described methods, correspondence between a phrase $c_i^I$ and a phrase $q_i^I$ is estimated. In the right side of the equation 3, $\varphi(c_i \mid q_i)$ (overline is omitted) is conditional probability of a phrase $c_i^I$ and a phrase $q_i^I$, indicates the same score described above. In the right side of the equation 3, $\text{start}_i$ is the first block of phrases of a declarative sentence on the input side corresponding to ith phrase of a question sentence on the output side, and $\text{end}_{i-1}$ is the last block of phrases of a declarative sentence on the input side corresponding to i-1th phrase of a question sentence on the output side. $d(\text{start}_i - \text{end}_{i-1})$ indicates skewness probability distribution of these phrases. In the association data D, a value of the equation 3 is increased when the number of combinations of a phrase $c_i^I$ and a phrase $q_i^I$ is greater.

[Converter Using Neural Machine Translation Method]

Next, a converter C using the neural machine translation method will be described. The neural machine translation method is a machine translation method using recurrent neural network or convolutional neural network, which are types of machine learning. While the statistical machine translation method is for translating each word or each phrase, the neural machine translation method is for translating an entire sentence.

In the neural machine translation method as well, two types of processes, the model building process for previously building models and the translation process for translating input sentences, are executed similarly to the statistical machine translation method. These processes are executed based on the program of the machine translator. That is, the processes described below are defined in the program code of the machine translator. The same applies to the converter C created by the creation unit 102, and processes of the converter C are defined in the program code.

FIG. 6 is a diagram for explaining a system of the neural machine translation method. Here, the translation process will be described first so as to explain an algorithm of the neural machine translation. Similarly to the statistical machine translation, a case will be described in which a Japanese sentence is translated into an English sentence.

As shown in FIG. 6, when a Japanese sentence is entered into the machine translator in the translation process, the entered sentence is divided into words or phrases, which are entered in the machine translator in order. A feature amount of the entire sentence is thereby calculated. The feature amount is a numerical sequence called distributed representation, and is represented by, for example, multidimensional vector information or an arrangement including a lot of elements. Each time a word or a phrase is entered, a feature amount of the entered word or phrase is synthesized with the feature amount calculated up to that time. The last word or phrase is entered and calculation of the feature amount is finished, the feature amount provides a value indicating features of the entire sentence that is entered.

Subsequently, a predetermined word indicating a start of translation, such as "BEGIN", is entered, which initiates outputting of English words or English phrases. The English word or the English phrase is output by referring to a model that is built according to a model building process described later. This model defines relationship between a feature amount and an English word or an English phrase to be output. In the example of FIG. 6, a translated word "he" is output first based on the feature amount.

The output translated word is entered into the machine translator again, and synthesized with the feature amount. This enables the feature amount to reflect which translated word is output. Subsequently, a translated word "went" is output based on the synthesized feature amount, and this translated word is entered and synthesized with the feature amount. This process is repeated until a predetermined word indicating the end of a sentence (e.g., "END") is output. When the predetermined word indicating the end of a sentence is output, translated sentences that are output up to that time are arranged in order and output as a translated sentence, and the translation process terminates.

In the model building process, a parameter of the machine translator is optimized using the parallel translation data D1.

The parameter is a coefficient of an equation for calculating a feature amount or a coefficient inside a model. The parallel translation data D1 is the same as that in the statistical machine translation method. For example, when a declarative sentence stored in the parallel translation data D1 is entered into the machine translator, the parameter is optimized so that a question sentence stored in the parallel translation data D1 is output. Various methods used in neural networks, such as back propagation, can be applied to optimize parameters.

In the neural machine translation method described above, an input sentence is described in a single distributed representation. As such, when the sentence is long, the features may not be properly represented. As such, a model of the neural machine translation method using attention mechanism may be used in which information of a sentence is contained as distributed representations, and when outputting a translated word, a part that should be translated next is estimated and information about such a part is used to select a translated word, instead of describing the input sentence in a single distributed representation.

As described above, the machine translator using the neural machine translation method adjusts a parameter of the machine translator based on the parallel translation data D1, and inputs a Japanese sentence into the machine translator to which the parameter is adjusted, thereby outputting an English sentence.

For example, the creation unit 102 creates a converter C based on the machine translator using the neural machine translation method described above. The converter C using the neural machine translation method calculates a feature amount of the entered sentence, and conversion is performed based on the calculated feature amount. The meaning of the feature amount is as described above. The creation unit 102 adjusts a parameter using the association data D instead of the parallel translation data D1. The method for adjusting a parameter is as described above. When a declarative sentence stored in the association data D is entered into the converter C, the creation unit 102 optimizes a parameter so that a question sentence stored in the association data D is output.

The translation process illustrated in FIG. 6 corresponds to processes of the input unit 103 and the sentence obtaining unit 104 described later, and thus will be described later. The neural machine translation method for creating the converter C is not limited to the above example. The neural machine translation method may adopt other methods. For example, the method described in theses such as "Neural Machine Translation and Sequence-to-sequence Models: A Tutorial (https://arxiv.org/abs/1703.01619)" may be used.

The method using the neural machine translation method mentioned above can be described using equations as follows. It is known that accuracy of the neural machine translation method depends on what we call bi-directional architecture or attention mechanism, and the neural machine translation method defines conditional probability distribution P(q|c) of the equation 1 as equation below. The neural machine translation method aims to maximize the equation 4 below.

$$P(q|c) = \Pi_{t=1}^{|q|} P(q_t|c, q_1 \ldots {}_{t-1}). \qquad \text{Equation 4}$$

In the equation 4, $q_t$ indicates each word that makes up a question sentence q output from the converter C; t is a time step in recurrent neural networks. Here, conditional probability distribution P(q|c) is treated as an estimated result of a word level, and when probability (conversion accuracy) of each word is higher, a value is greater. Probability of each word $q_t$ is calculated by a declarative sentence c entered in the converter C and words $q_1$ to $q_{t-1}$ generated up to that time. P ($q_t$|c, $q_1 \ldots {}_{t-1}$) in the right side of the equation 4 is probability of each word $q_t$, and specifically, defined as shown in equation 5 below.

$$P(q_t|c, q_1 \ldots {}_{t-1}) = \text{softmax}(W_q \tan h(W_b[b_t; a_t])). \qquad \text{Equation 5}$$

In the right side of the equation 5, $b_t$ indicates a state variable in time step t, and $a_t$ indicates attention probability at a time step t. $W_q$ and $W_b$ in the right side of the equation 5 are learnt parameters, and softmax is a softmax function. The equation 5 is an example of a formula of probability of a word $q_t$, and various known formulas can be applied to the calculation of probability.

For example, the neural machine translation method uses Bi-LSTM (Bi-directional Long Short-Term Memory). Here, before explaining the Bi-LSTM, LSTM will be briefly described.

LSTM is used to extract a word w included in a declarative sentence that is entered, and the extracted word w is represented in a n-dimensional vector (n is a natural number more than e.g., hundreds or thousands) using a word dictionary prepared in advance. This vector is a feature amount indicating features of the word w. A LSTM architecture is composed of recurrently connected memory blocks. These memory blocks are used in LSTM to record and read out time-series information. Each memory block includes a memory cell and three gates. These three gates are what we call input gate, a forget gate, and an output gate, and, for example, the memory blocks are represented as following equations 6 to 10 when the gates are represented as i, f, and o respectively:

$$i_t = \sigma(W_{xi}x_t + W_{hi}h_{t-1} + W_{ci}c_{t-1} + b_i), \qquad \text{Equation 6}$$

$$f_t = \sigma(W_{xf}x_t + W_{hf}h_{t-1} + W_{cf}c_{t-1} + b_f), \qquad \text{Equation 7}$$

$$c_t = f_t c_{t-1} + i_t \tan h(W_{xc}x_t + W_{hc}h_{t-1} + b_c), \qquad \text{Equation 8}$$

$$o_t = \sigma(W_{xo}x_t + W_{ho}h_{t-1} + W_{co}c_t + b_o), \qquad \text{Equation 9}$$

$$h_t = o_t \tan h(c_t), \qquad \text{Equation 10}$$

In the equations 6 to 9, $x_t$ represents a vector indicated by a word w included in a declarative sentence c that is entered. In the equations 6, 7, and 9, σ represents a logical sigmoid function, and in equations 6 to 9, h represents a hidden vector and is defined by the equation 10. W and b are weighting coefficients. $c_t$ and $c_{t-1}$ are memory cells in time step t and t-1, respectively. LSTM may use various known methods and is not limited to the above examples.

LSTM considers only earlier information in time-wise, and thus Bi-LSTM is used to also consider later information in time-wise. In Bi-LSTM, a forward equation for considering earlier information in time-wise and a backward equation for considering later information in time-wise are calculated, and both results are considered to determine outputs. For example, in Bi-LSTM, a state variable $b_t$ is defined by equation 11 below, and attention probability of a declarative sentence c in time step t is calculated by a weighted average of a state variable as shown in equation 12 below. A weighting coefficient $aw_{i,t}$ in equation 12 is defined as equation 13 below.

$$b_t = [\overrightarrow{h_t}; \overleftarrow{h_t}]. \qquad \text{Equation 11}$$

$$a_t = \sum_{i=1,\ldots,|c|} aw_{i,t} b_i. \qquad \text{Equation 12}$$

-continued $$a\omega_{i,t} = \frac{\exp(b_{target}^T w_b \overline{b}_{source})}{\sum_{source'} \exp(b_{target}^T w_b \overline{b}_{source'})}.$$  Equation 13

In learning in the neural machine translation method, all parameters θ are determined so as to minimize log-likelihood of teaching data $S=\{(c^{(i)},q^{(i)})\}_{i=1}^{S}$ as shown in:

$$\mathcal{L} = -\Sigma_{i=1}^{S} \Sigma_{j}^{|q|} \log P(q_j^{(i)} | c^{(i)}, y_{1 \ldots j-1}^{(i)}; \theta).$$  Equation 14

As described above, the creation unit 102 uses methods of a machine translator to build models and adjust parameters, thereby creating a converter C and stores the created converter in the data storage unit 100. In this embodiment, there are a plurality of classifications of question sentences, and association data D is prepared for each classification. As such, the creation unit 102 creates a converter C for each classification based on association data D of each classification. For example, the creation unit 102 creates a converter C for YN-question sentences based on the association data $D_{YN}$ for YN-question sentences, and creates a converter C for WH-question sentences based on the association data $D_{WH}$ for WH-question sentences.

The creation unit 102 may create a converter C for YN-question sentences and a converter C for WH-question sentences without using different sets of association data D. For example, the creation unit 102 may create a converter C for YN-question sentences and a converter C for WH-question sentences based on data combining association data $D_{YN}$ and $D_{WH}$.

[3-4. Input Unit]

The input unit 103 inputs a first type sentence in a converter C. In this embodiment, a declarative sentence corresponds to the first type sentence, and thus the input unit 103 inputs a declarative sentence in the converter C. The declarative sentence may be stored in the data storage unit 100, or stored in an external computer other than the server 20 or an external information storage medium. As another example, the administrator may input a declarative sentence from the administrator terminal 30.

In this embodiment, a converter C is prepared for each classification, and thus the input unit 103 inputs a declarative sentence in a converter C for at least one classification. Among the plurality of converters C, the input unit 103 may input a declarative sentence in a converter C specified by the administrator from the administrator terminal 30, or in converters C of all classifications.

In this embodiment, the input unit 103 inputs a declarative sentence indicating a feature of an item in a converter C. For example, the input unit 103 may input, in the converter C, a review of an item entered by a user, or an explanation of an item entered by the administrator or a shop. As another example, the input unit 103 may input text of an instruction manual of an item in a converter C.

[3-5. Sentence Obtaining Unit]

The sentence obtaining unit 104 obtains a sentence converted by a converter C into a second type in the same language. In this embodiment, a question sentence corresponds to the second type sentence, and thus the sentence obtaining unit 104 obtains a question sentence converted by the converter C. Methods for converting sentences by converters C are different depending on machine translators used when creating the converters C. As described above, any machine translator is applicable to the machine translator. In this embodiment, the statistical machine translation method and the neural machine translation method are taken as examples, and thus the conversion method using these methods will be described.

A case will be described in which a declarative sentence is entered into a converter C created by using the statistical machine translation method. This process flow is the same as the process flow of the machine translator described by referring to FIG. 5, and the converter C converts a declarative sentence into a question sentence based on the conversion model and the language model built in the model building process.

For example, when the input unit 103 inputs a declarative sentence in the converter C, the converter C divides the declarative sentence into phrases, and searches phrases of question sentences corresponding to the phrases of the declarative sentence based on the conversion model. The converter C may search phrases of all of the question sentences corresponding to the phrases of the declarative sentence, or search only the phrases having probability of a threshold value or more.

The converter C calculates a score of each of sentences generated by combining the searched phrases of question sentences based on probabilities stored in the conversion model and probabilities stored in the language model. The score is a value indicating accuracy of conversion, and the converter C calculates the score by substitution of these probabilities into a predetermined equation. A sentence including more number of combinations of phrases having higher probability has a high score. The converter C searches a combination of phrases having the highest score and properly matching the declarative sentence, and outputs a sentence obtained by combining these phrases.

Next, a process performed when a declarative sentence is entered in a converter C created by using the neural machine translation method will be described. This process flow is the same as the process flow of the machine translator described by referring to FIG. 6, and the converter C calculates a feature amount of the declarative sentence based on a parameter adjusted in the model building process, and converts the declarative sentence into a question sentence.

For example, when the input unit 103 inputs a declarative sentence in the converter C, the converter C divides the entered declarative sentence into words or phrases, sequentially inputs the divided words or phrases, and calculates a feature amount of the entire sentence. Each time a word or a phrase is entered, the feature amount of the entered word or phrase is synthesized with the feature amount calculated up to that time. As such, when the last word or phrase is entered and calculation of the feature amount is finished, the feature amount of the entire entered declarative sentence is calculated.

Subsequently, the converter C inputs a predetermined word indicating a start of translation, such as "BEGIN", by which outputting of a word or a phrase of a question sentence is initiated. The model building process previously studies what word or phrase is output for what feature amount. The converter C inputs the output word or phrase again to be synthesized with the feature amount. This enables the feature amount to reflect which word or phrase is output.

The converter C repeats outputting a word or a phrase and inputting the word or the phrase until a predetermined word indicating the end of a sentence (e.g., "END") is output. When the converter C outputs the predetermined word indicating the end of a sentence, words or phrases that are output up to that time are arranged in order and output as a question sentence, and the conversion process terminates. In a case where a converter C is created by using the neural machine translation method with the attention mechanism, the converter C outputs the converted phrase while estimating a part to be converted next in the process of outputting phrases of a question sentence.

As described above, the sentence obtaining unit 104 obtains a question sentence that is output from the converter C using the method of the machine translator. In this embodiment, a converter C is prepared for each classification, and thus the sentence obtaining unit 104 uses a converter C for at least one classification to obtain a sentence converted into such a classification of the same language. For example, the sentence obtaining unit 104 obtains a YN-question sentence output by a converter C for YN-question sentences, and obtains a WH-question sentence output by a converter C for WH-question sentences.

[3-6. Generation Unit]

The generation unit 105 generates Q & A or FAQ of an item based on the entered declarative sentence and the obtained question sentence. The generation unit 105 stores a combination of the declarative sentence and the question sentence in the data storage unit 100 so as to be available as Q & A or FAQ of the item. For example, when a request for displaying Q & A or FAQ of an item is received from the user terminal 20, the stored combination is referred to and a page of Q & A or FAQ is displayed on the user terminal 20.

[4. Processing Executed in this Embodiment]

FIG. 7 is a flow chart showing an example of processing executed in the server 10. The processing shown in FIG. 7 is executed when the control unit 11 operates in accordance with the program stored in the storage unit 12. The processing described in FIG. 7 is an example of the processing executed by the functional block shown in FIG. 2.

Here, a case will be described in which a converter C using the statistical machine translation method and a converter C using the neural machine translation method are created, although only one of these may be created. When the process shown in FIG. 7 is executed, assume a case where the association data $D_{YN}$ for YN-question sentences and the association data $D_{WH}$ for WH-question sentences are created and stored in the storage unit 12. Further, assume a case where a machine translator using the statistical machine translation method before building models and a machine translator using the neural machine translation method before adjusting parameters are stored in the storage unit 12.

As shown in FIG. 7, the control unit 11 creates a converter $C_{SYN}$ for YN-question sentences based on the association data $D_{YN}$ for YN-question sentences and a machine translator using the statistical machine translation method (S1). In S1, the control unit 11 divides sentences into phrases for each combination of a declarative sentence and a question sentences stored in the association data $D_{YN}$, and estimates correspondence between these sentences. The control unit 11 takes statistics on correspondence between the phrases to build a conversion model. The control unit 11 takes statistics on consecutive phrases in question sentences stored in the association data $D_{YN}$ to build a language model. The control unit 11 stores the built conversion model and language model in the storage unit 12, thereby creating a converter $C_{SYN}$.

The control unit 11 creates a converter $C_{SWH}$ for WH-question sentences based on the association data $D_{WH}$ for WH-question sentences and the machine translator using the statistical machine translation method (S2). The process in S2 is the same as the process in S1 except that the association data $D_{WH}$ for WH-question sentences is referred to.

The control unit 11 creates a converter $C_{NYN}$ for YN-question sentences based on the association data $D_{YN}$ for YN-question sentences and the machine translator using the neural machine translation method (S3). In S3, in a case where a declarative sentence stored in the association data D is entered, the control unit 11 adjusts the parameter so that a corresponding question sentence is output, thereby creating a converter $C_{NYN}$.

The control unit 11 creates a converter $C_{NWH}$ for WH-question sentences based on the association data $D_{WH}$ for WH-question sentences and the machine translator using the neural machine translation method (S4). The process in S4 is the same as the process in S3 except that the association data $D_{WH}$ for WH-question sentences is referred to.

The control unit 11 obtains a declarative sentence that is desired to be converted into a question sentence from the administrator terminal (S5). In S5, the control unit 11 obtains a declarative sentence entered by the administrator in the administrator terminal 30. Here, a case will be described in which a declarative sentence to be converted is entered in the administrator terminal 30, although a declarative sentence to be converted may be stored in the storage unit 12 of the server 10, or in the storage unit 32 of the administrator terminal 30. As another example, a declarative sentence to be converted may be obtained from other computers, such as the user terminal 10.

The control unit 11 inputs the declarative sentence obtained in S5 into the converters $C_{SYN}$, $C_{SWH}$, $C_{NYN}$, and $C_{NWH}$, respectively created in S1 to S4 (S6). Here, the declarative sentence is entered into all of four converters $C_{SYN}$, $C_{SWH}$, $C_{NYN}$, and $C_{NWH}$, although the declarative sentence may be entered into at least one converter. For example, the declarative sentence may be entered into only the converter C specified by the administrator.

The control unit 11 obtains question sentences converted by the converters $C_{SYN}$, $C_{SWH}$, $C_{NYN}$, and $C_{NWH}$, respectively created in S1 to S4 (S7). Here, the declarative sentence is entered into all of the four converters $C_{SYN}$, $C_{SWH}$, $C_{NYN}$, and $C_{NWH}$, and thus four question sentences are obtained for one declarative sentence.

The control unit 11 stores the declarative sentence entered in S6 and the question sentence obtained in S7 in association with each other in the storage unit 12 (S8), and the processing terminates. As described above, the declarative sentence and the question sentence stored in S8 may be used for any purpose, such as an examination question if an answer to the examination is entered as the declarative sentence, and question and answer sentences such as Q & A or FAQ if an explanation of an item is entered as the declarative sentence. Here, one declarative sentence is associated with four question sentences, although the question sentence actually used may be specified by the administrator, or the question sentence having the highest score calculated by the converter C may be actually used. For example, only the question sentence having the highest score may be stored in the storage unit 12.

The sentence conversion system S described above uses the system of the machine translator, which absorbs differences between appearance and grammar of different languages, for converting sentences in the same language, so as to effectively absorb differences between appearance and grammar of declarative sentences and question sentences. This eliminates the need of defining many rules by human hands as in the rule-based method, thereby improving accuracy of converting sentences without taking time and effort.

Further, with the use of the converter C created based on the machine translator using the statistical machine translation method, accuracy of converting sentences can be improved more effectively. The statistical machine translation method can assure the accuracy to some extent by using statistical information even if the number of combinations of declarative sentences and question sentences stored in the association data D is relatively small. This eliminates the need of preparing a large number of data sets of association data D, and also saves the memory consumption of the data storage unit 100.

Further, the converter C created based on the machine translator using the neural machine translation method can improve accuracy of converting sentences more effectively. The use of the neural machine translation method can improve accuracy of learning if it is possible to prepare abundant association data D, and thus accuracy of the converter C can be improved.

When creating a converter C for outputting sentences having multiple classifications, such as question sentences, association data D is prepared for each classification, and a converter C dedicated to each classification is created. As such, accuracy of converting sentences can be more effectively improved.

The association data D stores declarative sentences and question sentences in association with each other, and the converter C for converting a declarative sentence into a question sentence is created. This enables to convert a declarative sentence into a question sentence without taking time and effort.

A declarative sentence indicating a feature of an item is entered in a converter C, and Q & A or FAQ of the item is generated based on a question sentence output from the converter C. This can save time and effort for generating Q & A or FAQ of the item.

[5. Variations]

The present invention is not to be limited to the above described embodiment. The present invention is not to be limited to the above described embodiment and can be changed as appropriate without departing from the spirit of the invention.

(1) For example, a WH-question sentence includes any one of words such as What, Which, Why, Where, and How at the beginning, and may be further divided into these five sub classifications. As such, one classification may be divided into a plurality of sub classifications, and thus association data D and a converter C may be prepared for each sub classification.

The data storage unit 100 according to this variation stores association data D and a converter C for What question sentences, association data D and a converter C for Which question sentences, association data D and a converter C for Why question sentences, association data D and a converter C for Where question sentences, and association data D and a converter C for How question sentences.

The example of storing association data D is as indicated in the embodiment, and question sentences according to each sub classification are stored. For example, the association data D for What question sentences stores declarative sentences and question sentences obtained by converting the declarative sentence into sentences starting with What. For example, the association data D for Which question sentences stores declarative sentences and question sentences obtained by converting the declarative sentence into sentences starting with Which. For example, the association data D for Why question sentences stores declarative sentences and question sentences obtained by converting the declarative sentences into sentences starting with Why. For example, the association data D for Where question sentences stores declarative sentences and question sentences obtained by converting the declarative sentences into sentences starting with Where. For example, the association data D for How question sentences stores declarative sentences and question sentences obtained by converting the declarative sentences into sentences starting with How.

The data obtaining unit 101 obtains association data D for each of the sub classifications. The data obtaining unit 101 obtains association data D when a converter C is created, and thus association data D corresponding to the converter C to be created is obtained. For example, in a case where the creation unit 102 creates a converter C for What question sentences, the data obtaining unit 101 obtains the association data D of What question sentences, and in a case where the creation unit 102 creates a converter C for Which question sentences, the data obtaining unit 101 obtains the association data D of Which question sentences. The same applies to other sub classifications.

The creation unit 102 creates a converter C for each sub classification based on association data D of each sub classification. For example, the creation unit 102 creates a converter C for What question sentences based on the association data D for What question sentences, and creates a converter C for Which question sentences based on the association data $D_{WH}$ for Which question sentences. The same applies to other sub classifications.

The input unit 103 inputs a declarative sentence in a converter C for at least one sub classification. Among the converters C for the sub classifications, the input unit 103 may input a declarative sentence in a converter C specified by the administrator from the administrator terminal 30, or input a declarative sentence in converters C for all sub classifications.

The sentence obtaining unit 104 obtains a sentence converted into a sub classification in the same language by the converter C for at least one sub classification. For example, the sentence obtaining unit 104 obtains a What-question sentence output by a converter C for What question sentences, and obtains a Which-question sentence output by a converter C for Which question sentences. The same applies to other sub classifications.

According to the variation (1), when creating a converter C for outputting sentences having multiple sub classifications, such as question sentences, association data D is prepared for each sub classification, and a converter C dedicated to each sub classification is created. As such, accuracy of converting sentences can be more effectively improved.

(2) In the embodiment, the converter C that converts a declarative sentence into a question sentence is created, although a converter C that converts a question sentence into a declarative sentence may be created. That is, a question sentence may correspond to the first type sentence, and a declarative sentence may correspond to the second type sentence. In this case, the association data D indicates association between the question sentence and the declarative sentence. The method for creating the converter C is the same as described in the embodiment.

In this variation, the question sentence corresponds to the first type sentence, and thus the first type sentence has a plurality of classifications. In the embodiment, association data D and a converter C are prepared for each classification of a sentence on the output side of the converter C, although association data D and a converter C may be prepared for each classification of a sentence on the input side of the converter C.

For example, in the association data $D_{YN}$ for YN-question sentences, a question sentence in the YN-format is associated with a sentence obtained by converting the question sentence into a declarative sentence in the same language. This declarative sentence is an answer to the question sentence in the YN-format. For example, the administrator deletes a word, such as Do and Does, at the beginning of a question sentence to change a written form of a predicate, thereby inputting a declarative sentence. For example, in the association data $D_{WH}$ for WH-question sentences, a question sentence in the WH-format is associated with a sentence obtained by converting the question sentence into a declarative sentence in the same language. This declarative sentence is an answer to the question sentence in the WH-format. For example, the administrator deletes a word, such as a WH-word and How, at the beginning of a question sentence to change a written form of a predicate, thereby inputting a declarative sentence.

The data obtaining unit 101 obtains association data D for each of the classifications. The data obtaining unit 101 obtains association data D when a converter C is created, and thus association data D corresponding to a converter C to be created is obtained. For example, if the creation unit 102 creates a converter C for YN-question sentences, the data obtaining unit 101 obtains the association data D for YN-question sentences, and if the creation unit 102 creates a converter C for WH-question sentences, the data obtaining unit 101 obtains the association data D for WH-question sentences.

The creation unit 102 creates a converter C for each classification based on association data D of each classification. For example, the creation unit 102 creates a converter C for YN-question sentences based on the association data $D_{YN}$ for YN-question sentences, and creates a converter C for WH-question sentences based on the association data $D_{WH}$ for WH-question sentences.

The input unit 103 inputs, in a converter C for at least one classification, a sentence of such a classification. For example, the input unit 103 determines a classification of a question sentence to be entered, and inputs the question sentence in a converter C of the determined classification. For example, if the question sentence includes Do or Does at the beginning, the input unit 103 inputs the question sentence in a converter C for YN-question sentences, and if the question sentence includes a wh-word or How at the beginning, the input unit 103 inputs the question sentence in a converter C for WH-question sentences. As another example, the input unit 103 may input a question sentence in a converter C specified by the administrator.

According to the variation (2), when creating a converter C in which sentences having multiple classifications, such as question sentences, are entered, association data D is prepared for each classification and a converter C dedicated to each classification is created. This can improve accuracy of converting sentences more effectively.

(3) For example, when a question sentence is entered in a converter C as in the variation (2), the question sentence has a plurality of sub classifications as described in the variation (1). As such, the at least one classification may be divided into a plurality of sub classifications, and thus association data D and a converter C may be prepared for each sub classification.

The data storage unit 100 according to this variation stores association data D and a converter C for What question sentences, association data D and a converter C for Which question sentences, association data D and a converter C for Why question sentences, association data D and a converter C for Where question sentences, and association data D and a converter C for How question sentences. For example, the association data D for What question sentences stores question sentences starting with What and sentences obtained by converting the question sentences into declarative sentences. For example, the association data D for Which question sentences stores question sentences starting with Which and sentences obtained by converting the question sentences into declarative sentences. For example, the association data D for Why question sentences stores question sentences starting with Why and sentences obtained by converting the question sentences into declarative sentences. For example, the association data D for Where question sentences stores question sentences starting with Where and sentences obtained by converting the question sentences into declarative sentences. For example, the association data D for How question sentences stores question sentences starting with How and sentences obtained by converting the question sentences into declarative sentences.

The data obtaining unit 101 obtains association data D for each of the sub classifications. The data obtaining unit 101 obtains association data D when a converter C is created, and thus obtains association data D according to a sub classification of the converter C to be created. For example, in a case where the creation unit 102 creates a converter C for What question sentences, the data obtaining unit 101 obtains the association data D for What question sentences, and in a case where the creation unit 102 creates a converter C for Which question sentences, the data obtaining unit 101 obtains the association data D for Which question sentences. The same applies to other sub classifications.

The creation unit 102 creates a converter C for each sub classification based on association data D of each sub classification. For example, the creation unit 102 creates a converter C for What question sentences based on the association data D for What question sentences, and creates a converter C for Which question sentences based on the association data $D_{WH}$ for Which question sentences. The same applies to other sub classifications.

The input unit 103 inputs, in a converter C for at least one classification, a sentence of such a classification. For example, the input unit 103 determines a sub classification of a question sentence to be entered, and inputs the question sentence in a converter C of the determined classification. For example, if the question sentence includes What at the beginning, the input unit 103 inputs the question sentence in a converter C for What question sentences, and if the question sentence includes Which at the beginning, the input unit 103 inputs the question sentence in a converter C for Which question sentences. As another example, the input unit 103 may input a question sentence in a converter C specified by the administrator.

According to the variation (3), when creating a converter C in which sentences having multiple sub classifications, such as question sentences, are entered, association data D is prepared for each sub classification and a converter C dedicated to each sub classification is created. This can improve accuracy of converting sentences more effectively.

(4) For example, two or more of the above described variations may be combined.

Further, for example, the statistical machine translation method and the neural machine translation method are described as examples of the machine translator, although a machine translator using other method may be used to create a converter C. For example, a machine translator using an example-based machine translation method may be used. In the example-based machine translation method, a sentence similar to an input sentence desired to be translated is searched from a large number of parallel translated sentences, and a description corresponding to a part of the parallel translated sentence that does not match the input sentence is rewritten.

For example, in the embodiment, the case has been described in which the sentence conversion system S is used for generating Q & A or FAQ of items, although the sentence conversion system S may convert sentences for various other purposes. For example, the sentence conversion system S may convert sentences for generating chats by Chabot, or for creating examination questions. For example, if the sentence conversion system S is used for Chabot, the sentence conversion system S generates a question sentence indicating a chat of Chabot. For example, if the sentence conversion system S is used for creating examination questions, the sentence conversion system S generates questions based on answers to the examination questions.

For example, the converter C that converts a declarative sentence into a question sentence and the converter C that converts a question sentence into a declarative sentence have been described, although the converter C can convert any type of sentences, and types of sentences to be converted by the converter C are not limited to these examples. For example, the sentence conversion system S may create a converter C that converts a declarative sentence into an imperative sentence, or a converter C that converts an imperative sentence into a declarative sentence. Further, for example, the sentence conversion system S may create a converter C that converts a declarative sentence into an exclamatory sentence, or a converter C that converts an exclamatory sentence into a declarative sentence. As another example, the sentence conversion system S may create a converter C that converts a sentence in a dialect used in an area into a sentence in another dialect used in another area in the same language (same country).

For example, the case has been described in which the functions are implemented in the server 10, although the functions may be shared among a plurality of computers. For example, the functions may be shared among the server 10, the user terminal 20, and the administrator terminal 30, or shared among a plurality of computers. In this case, the functions may be shared by sending and receiving the processing results through a network. For example, the data described as being stored in the data storage unit 100 may be stored in a computer other than the server 10.

The invention claimed is:

1. A sentence conversion system comprising:
at least one processor and at least one storage unit in communication with the processor, the processor configured to:
obtain data from the storage unit, the data including a first type sentence and a second type sentence in association with each other, the second type sentence being a sentence obtained by converting the first type sentence into a second type in a same language;
create at least one converter that converts a sentence type in the same language based on the data and a machine translator that translates a first language into a second language, wherein the at least one converter is stored in the storage unit;
input the first type sentence in the at least one converter;
obtain the second type sentence converted by the at least one converter in the same language; and
store the second type sentence in the storage unit;
wherein
the second type has a plurality of classifications,
the data and the at least one converter are prepared for each of the plurality of classifications,
the at least one processor:
obtains data of each of the plurality of classifications,
creates a converter for each of the plurality of classifications based on data of each of the plurality of classifications,
inputs the first type sentence in a converter for at least one classification, and
obtains a sentence converted into the classification in the same language by the converter for the at least one classification.

2. The sentence conversion system according to claim 1, wherein
the at least one processor creates the at least one converter based on the machine translator using a statistical machine translation method.

3. The sentence conversion system according to claim 1, wherein
the at least one processor creates the at least one converter based on the machine translator using a neural machine translation method.

4. The sentence conversion system according to claim 1, wherein
the at least one classification has a plurality of sub classifications,
the data and the at least one converter are prepared for each of the plurality of sub classifications,
the at least one processor:
obtains data of each of the plurality of sub classifications,
creates a converter for each of the plurality of sub classifications based on data of each of the plurality of sub classifications,
inputs the first type sentence in a converter for at least one sub classification, and
obtains a sentence converted into the sub classification in the same language by the converter for the at least one sub classification.

5. A sentence conversion system comprising:
at least one processor and at least one storage unit in communication with the processor, the processor configured to:
obtain data from the storage unit, the data including a first type sentence and a second type sentence in association with each other, the second type sentence being a sentence obtained by converting the first type sentence into a second type in a same language;
create at least one converter that converts a sentence type in the same language based on the data and a machine translator that translates a first language into a second language, wherein the at least one converter is stored in the storage unit;
input the first type sentence in the at least one converter;
obtain the second type sentence converted by the at least one converter in the same language; and
store the second type sentence in the storage unit;
wherein
the first type has a plurality of classifications,
the data and the at least one converter are prepared for each of the plurality of classifications, the at least one processor:
  obtains data of each of the plurality of classifications,
  creates a converter for each of the plurality of classifications based on data of each of the plurality of classifications, and
  inputs, in a converter for at least one classification, a sentence of the at least one classification.

6. The sentence conversion system according to claim 5, wherein
the at least one classification has a plurality of sub classifications,
the data and the at least one converter are prepared for each of the plurality of sub classifications,
the at least one processor:
  obtains data of each of the plurality of sub classifications,
  creates a converter for each of the plurality of sub classifications based on data of each of the plurality of sub classifications, and
  inputs, in a converter for at least one sub classification, a sentence of the at least one sub classification.

7. The sentence conversion system according to claim 1, wherein
the first type sentence is a declarative sentence,
the second type sentence is a question sentence,
the data is associated with a declarative sentence and a question sentence, and
the at least one converter converts a declarative sentence into a question sentence in the same language.

8. The sentence conversion system according to claim 7, wherein
the at least one processor:
  inputs a declarative sentence indicating a feature of an item in the at least one converter,
  obtains a question sentence converted by the at least one converter, the question sentence asking the feature of the item, and
  generates Q & A (Question and Answer) or FAQ (Frequently Asked Questions) of the item based on the input declarative sentence and the obtained question sentence.

9. A non-volatile information storage medium that stores a program for at least one converter that is created based on data and a machine translator that translates a first language into a second language, the data which includes a first type sentence and a second type sentence in association with each other, the second type sentence being a sentence obtained by converting the first type sentence into a second type in a same language, the program causing a computer to:
  in a case where the first type sentence is entered, obtain the second type sentence converted in the same language; and
  store the second type sentence in at least one storage unit in communication with the computer;
wherein
the second type has a plurality of classifications,
the data and the at least one converter are prepared for each of the plurality of classifications,
the computer:
  obtains data of each of the plurality of classifications,
  creates a converter for each of the plurality of classifications based on data of each of the plurality of classifications,
  inputs the first type sentence in a converter for at least one classification, and
  obtains a sentence converted into the classification in the same language by the converter for the at least one classification.

10. A non-volatile information storage medium that stores a program for at least one converter that is created based on data and a machine translator that translates a first language into a second language, the data which includes a first type sentence and a second type sentence in association with each other, the second type sentence being a sentence obtained by converting the first type sentence into a second type in a same language, the program causing a computer to:
  in a case where the first type sentence is entered, obtain the second type sentence converted in the same language; and
  store the second type sentence in at least one storage unit in communication with the computer;
wherein
the first type has a plurality of classifications,
the data and the at least one converter are prepared for each of the plurality of classifications,
the at least one processor:
  obtains data of each of the plurality of classifications,
  creates a converter for each of the plurality of classifications based on data of each of the plurality of classifications, and
  inputs, in a converter for at least one classification, a sentence of the at least one classification.

11. The sentence conversion system according to claim 1, wherein the at least one processor stores the first type sentence and the second type sentence in association with each other in the storage unit.

12. The sentence conversion system according to claim 5, wherein the at least one processor stores the first type sentence and the second type sentence in association with each other in the storage unit.

* * * * *